INVENTORS
MORTON L. WEIGEL AND
WENDELL A. FULLER
by
Mason, Kolehmainen, Rathburn and Wyss
ATTORNEYS INVENTORS
MORTON L. WEIGEL AND
WENDELL A. FULLER
by Mason, Kolehmainen, Rathburn and Wyss
ATTORNEYS INVENTORS
MORTON L. WEIGEL AND
WENDELL A. FULLER
by Mason, Kolehmainen, Rathburn and Wyss
ATTORNEYS INVENTORS
MORTON L. WEIGEL
AND WENDELL A. FULLER
by Mason, Kolehmainen, Rathburn and Wyss
ATTORNEYS

United States Patent Office 3,534,178
Patented Oct. 13, 1970

3,534,178

ARRANGEMENT FOR SIMULTANEOUS RECORDING OF A PLURALITY OF MAGNETIC TAPE CARTRIDGES

Morton L. Weigel and Wendell A. Fuller, Bloomington, Ind., assignors to Sarkes Tarzian, Inc., Bloomington, Ind., a corporation of Indiana Continuation of application Ser. No. 511,783, Dec. 6, 1965. This application June 16, 1969, Ser. No. 835,897
Int. Cl. B65h *59/38;* G11b *5/86, 15/24*
U.S. Cl. 179—100.2 6 Claims

ABSTRACT OF THE DISCLOSURE

An arrangement is provided for recording a given selection simultaneously on magnetic tape in a number of magnetic tape cartridges. The tape within each one of the plurality of cartridges is driven by means of separate drive means on a common driveshaft, said drive means being individually arranged automatically to disconnect the corresponding reel from the driveshaft when the end of the tape in the corresponding cartridge is reached.

The present application is a streamlined continuation of applicants' prior application Serial No. 511,783, filed December 6, 1965, and now abandoned.

The present invention relates to magnetic tape cartridges and also to methods of and apparatus for recording a selection on a tape contained within a magnetic tape cartridge.

In a copending application of Morton L. Weigel, Ser. No. 389,014, filed Aug. 12, 1964, now U.S. Pat. No. 3,439,127, and assigned to the same assignee as the present invention there is disclosed an automatic tape cartridge changing mechanism wherein an arrangement is provided for automatically playing in any desired sequence a number of magnetic tape cartridges each containing a relatively short length of magnetic tape. In such an arrangement a removable or detachable magazine is provided within which a plurality of magnetic tape cartridges can be arranged in any desired order, each cartridge having two reels on which is wound a relatively short length of tape sufficient to provide a playing time of from 3 to 5 minutes. The cartridge reels are provided with central apertures which may be placed over a drive shaft which engages directly the reel in one of the cartridges and rotates the same at constant speed so that the tape within this one cartridge is wound on the driven reel. An opening in the cartridge is provided between the two reels and the tape is moved past this opening as it wound on the driven reel so that it can be engaged by a suitable playback head.

While the arrangement described in the above-identified copending Weigel application is entirely satisfactory for its intended purpose, the speed of the tape as it moves past the playback head increases continuously throughout the length of the selection recorded on the tape since the reel on which the tape is wound is rotated at a constant speed. This means that as the tape within the cartridge is played, the level of the high frequency components of the recorded selection continuously increases. If the length of tape on which the selection is recorded is too long, the level of the high frequency component will reach such a magnitude that these "highs" will become objectionably shrill and produce a distortion noticeable to the average listener.

In accordance with one aspect of the invention claimed in the Weigel application, the length of tape within the cartridge is limited so that the change in tape speed from the beginning to the end of the recorded selection is in the order of 25 percent and does not produce a change in the level of the high frequency component of the reproduced selection which is of sufficient magnitude to be detected by the average listener.

In accordance with the present invention, an arrangement is provided for recording a selection on a magnetic tape positioned within a magnetic tape cartridge of the type described in the copending Weigel application while providing at least partial compensation for the change in tape speed as the selection is recorded. The improved magnetic tape cartridge provided in accordance therewith may then be played on an automatic tape cartridge changing mechanism such as disclosed in the Weigel application without an objectionable increase in the level of the high frequency components of the reproduced selection and without requiring any modification of the cartridge changing mechanism disclosed in the Weigel application. Furthermore, by providing compensation for the change in tape speed in accordance with the present invention, the length of magnetic tape utilized, and hence the length of the recorded selection, can be considerably longer and a considerably greater percentage change in tape speed from beginning to end of the selection can be tolerated without increasing the level of the high frequency components to a value detectable by the average listener.

While the automatic tape cartridge changing mechanism disclosed in the above-identified Weigel application can be used either to record a selection on a tape within a particular cartridge or to play back the prerecorded selection on the tape, the mechanism is particularly suited for playing back prerecorded selections on the tapes contained in different cartridges, somewhat in the manner of present day phonograph records.

Accordingly, it would be desirable to provide an arrangement whereby a given selection can be recorded on a large number of magnetic tape cartridges simultaneously so as to provide a mass production arrangement for producing prerecorded magnetic tape cartridges which could be sold to purchasers of the mechanism described in the above-identified Weigel application.

Furthermore, it would also be desirable to provide an arrangement for simultaneously recording a given selection on a large number of such magnetic tape cartridges while at the same time providing at least partial compensation for the change in tape speed over the length of the recorded selection so that during playback, the level of the high frequency components of the recorded selection remains substantially constant, or, in the alternative, a longer selection may be played without producing a change in the level of high frequency components which is objectionable to the listener.

It is, therefore, an object of the present invention to provide a new and improved method of recording a selection on a tape contained within a magnetic tape cartridge while providing compensation for a change in tape speed over the length of the recorded selection.

It is another object of the present invention to provide a new and improved arrangement for recording a selection on a length of magnetic tape positioned within a magnetic tape cartridge while continuously adjusting the level of the high frequency components of the recorded selection as it is recorded.

It is still another object of the present invention to provide a new and improved magnetic tape cartridge in which the level of the recorded selection varies over the length of the recorded selection to provide at least partial compensation for a change in tape speed as the selection is played.

It is further object of the present invention to provide a new and improved apparatus for recording a selection on a number of individual magnetic tapes contained within different magnetic tape cartridges at the same time.

It is still a further obect of the present invention to provide a new and improved apparatus for simultaneously recording a given selection on a large number of magnetic tapes positioned within individual magnetic tape cartridges.

It is another object of the present invention to provide a new and improved method and apparatus for recording a selection on a large number of magnetic tape cartridges which is particularly adaptable for high quantity production on a low cost basis.

It is a further object of the present invention to provide a new and improved apparatus for simultaneously recording a selection on different magnetic tapes contained within a large number of magnetic tape cartridges wherein facilities are provided for producing substantially constant rotation of one reel in each of the cartridges.

Briefly, in accordance with the present invention a magazine is provided for holding a large number of magnetic tape cartridges of the type disclosed in the above-identified Weigel application and this magazine is arranged to be positioned over an elongated drive shaft having a plurality of individual drive means placed along the length thereof in the correct relationship to engage one of the reels in each of the magnetic tape cartridges. Facilities are provided for driving this elongated drive shaft at a constant rotational velocity so that tape is wound on the driven reel in each of the cartridges simultaneously. A number of recording heads corresponding to the cartridges within the magazine are arranged to be moved into engagement with the tape as it is wound on one of the reels in each cartridge and an electrical signal is supplied to each of these recording heads so that a given selection may be simultaneously recorded on all of the cartridges at the same time.

In accordance with a further aspect of the invention, an arrangement is provided for modifying the frequency characteristic of the recording amplifier which produces the electrical signal supplied to the recording heads so that compensation is provided for the change in tape speed which takes place as each individual tape builds up on the driven reel. This provides compensation for the change in tape speed which occurs when the reel is driven directly at constant speed so that the prerecorded cartridges may be played in a magnetic tape cartridge changing mechanism, such as disclosed, for example, in the above-identified Weigel application, without producing an accentuated level of the high frequency components of the recorded selection near the end of the selection. Furthermore, such an arrangement permits a longer length of tape to be employed in each cartridge without producing an undesired increase in the level of high frequency components during playback.

In accordance with a still further aspect of the invention, facilities are provided for recording a stereo signal on each tape while providing the above-described compensation for change in tape speed during the recording operation.

The invention, both as to its organization and method of operation, together with further objects and advantages thereof, will best be understood by reference to the following specification taken in connection with the accompanying drawings in which.

Figures 1, 7:
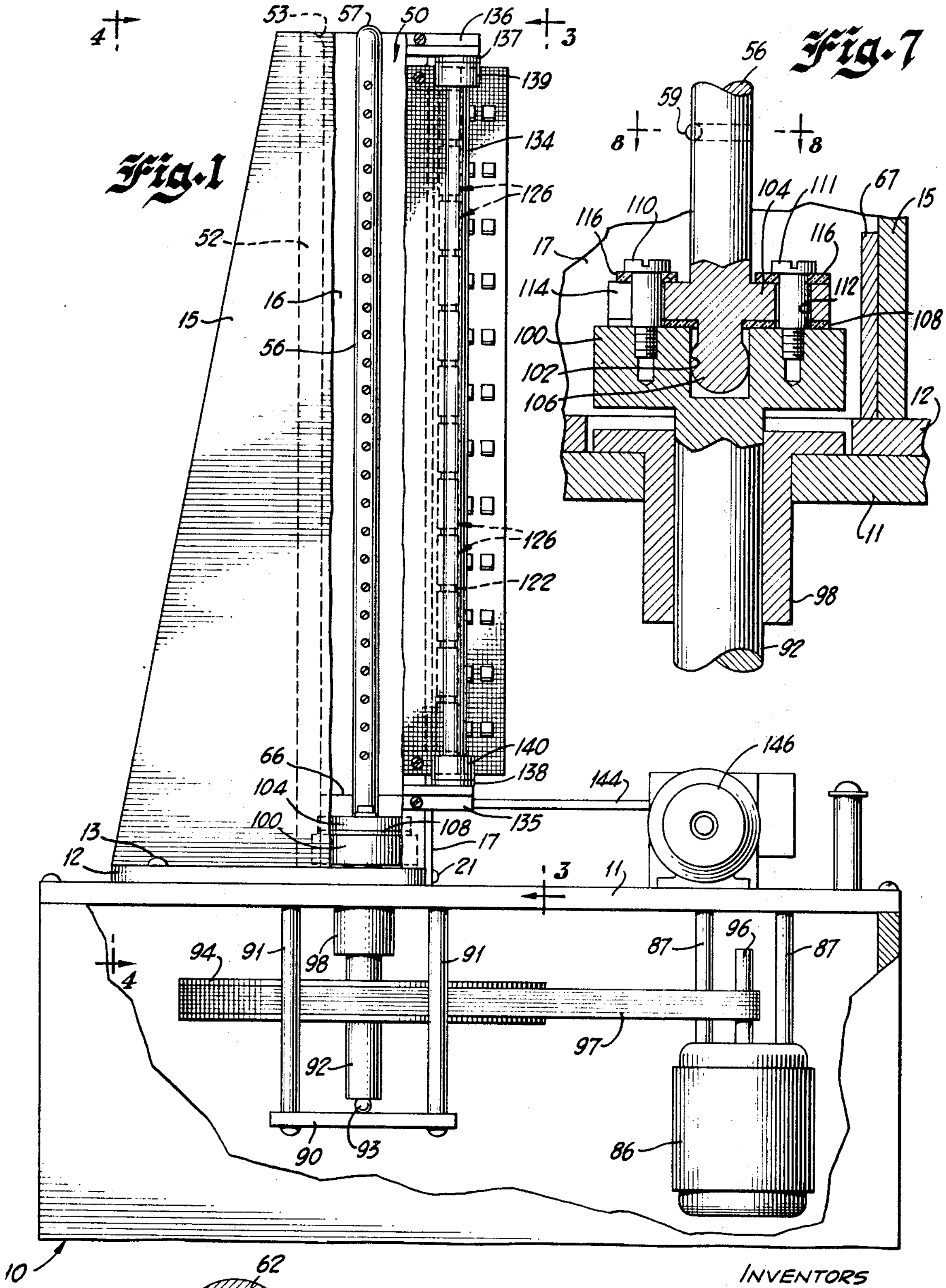
FIG. 1 is a side elevational view of an apparatus embodying the features of the present invention wherein a selection may be simultaneously recorded on the individual tapes contained within a large number of magnetic tape cartridges.
FIG. 7 is a sectional view taken along the line 7—7 of FIG. 2 on a somewhat larger scale.
Figures 3, 4:
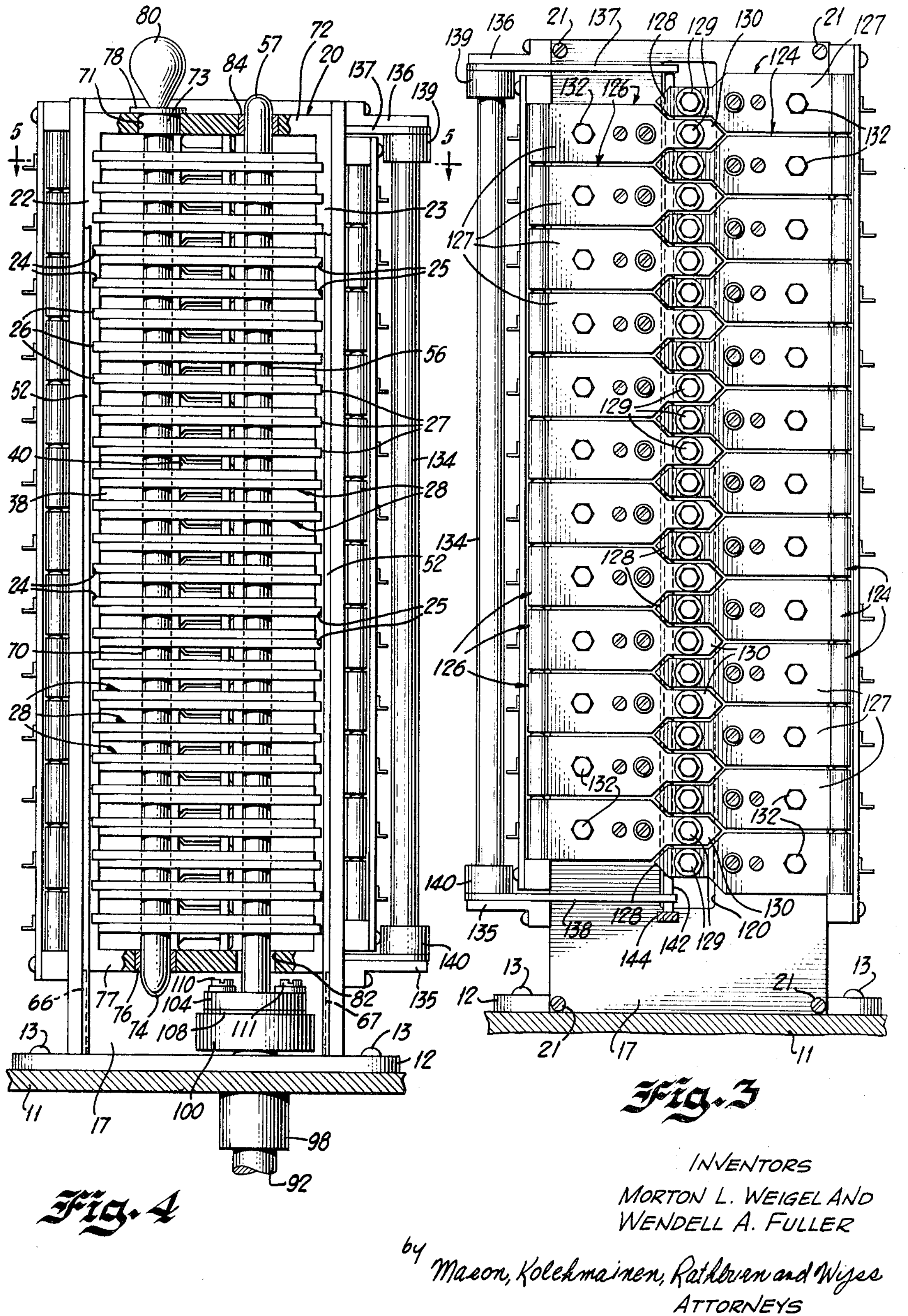
FIG. 3 is a fragmentary sectional view taken along the line 3—3 of FIG. 1 on a somewhat larger scale.
FIG. 4 is a fragmentary sectional view taken along the line 4—4 of FIG. 1 on a somewhat larger scale.

Referring now to the drawings, a supporting base assembly indicated generally at 10 is provided with a top wall 11 which acts as a base plate to support the recording apparatus of the present invention. A subassembly 12, which is secured to the base 11 by means of the screws 13, is provided with a pair of vertically extending side wall portions 15 and 16 which together with a real wall 17 form an enclosure adapted to receive a magnetic tape cartridge containing magazine 20 (FIG. 4), the wall 17 being secured to the side walls 15 and 16 by means of the screws 21 (FIG. 1).

The magazine 20 is provided with side walls 22 and 23 which have horizontally extending grooves 24 and 25 formed therein and extending from front to back of the magazine 20. The grooves 24 are staggered vertically with respect to the groves 25 so that they are positioned correctly to receive the offset end flanges 26 and 27 of a magnetic tape cartridge 28. Preferably, the magazine 20 is of sufficient height to accommodate a large number of identical cartridges 28, in the order of twenty-five or more. Also, the magnetic tape cartridge 28 may be of the construction described in detail in the above-identified copending Weigel application, and reference may be had to this application for a detailed description of the construction of such cartridge. However, insofar as the present invention is concerned, any other suitable tape cartridge arrangement may be employed provided it is adapted to function with the drive and recording head mechanism described in detail hereinafter.

Figure 6:
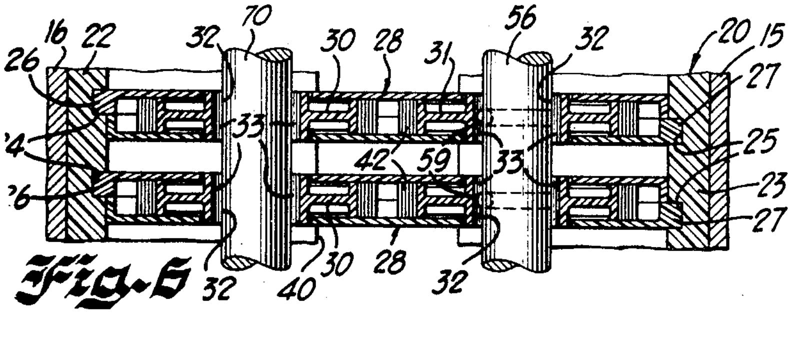
FIG. 6 is a sectional view taken along the line 6—6 of FIG. 5.

Each of the cartridges 28 is provided with a pair of reels 30 and 31 (FIG. 6) on which a length of magnetic tape is wound. Each of the reels 30 and 31 is provided with a central aperture 32 having a plurality of vertically extending grooves 33 therein which are engageable by a suitable drive mechanism so as to rotate one of the reels directly. Also, each of the cartridges 28 is provided with a flexible retaining lug portion 34 formed in the flange portion 26 of the cartridge which is adapted to snap into a vertically extending groove 35 formed in the side wall 22 of the magazine 20. A groove similar to the groove 35 is also provided in the magazine wall 23 which receives a similar flexible retaining lug formed in the edge flange 27 of each cartridge 28. With this arrangement, the cartridges 28 are held against the rear wall 38 of the magazine 20 by the locking action afforded by the retaining lugs 34 which snap into place as each cartridge 28 is inserted into the magazine 20.

As is described in detail in the above-identified copending Weigel application, each of the cartridges 28 is arranged to be inserted into the magazine 20 in either one of two positions so that the tape may be wound from one of the reels 30, 31 to the other during one playback operation and the cartridge, or magazine, may be inverted so that the tape is wound back onto the original reel during the next succeeding playback operation. The rear wall 38 of the magazine 20 is provided with a vertically extending slot 40 which provides access to the rear edge of each one of the cartridges 28 and each of these cartridges is provided with a corresponding opening 41 in the rear edge thereof through which the magnetic tape 42 is accessible as it is wound on one of the reels 30, 31.

The side walls 15, 16 and rear wall 17 define a magazine receiving well indicated generally at 50 within which the magazine 20 may be inserted from the top. The side walls 15 and 16 have vertically extending guide flanges 52 mounted thereon, each of the flanges having a curved upper edge 53 (FIG. 1) which functions to guide the magazine 20 as it is inserted into the well 50. The guide flanges 52 are positioned on the side walls 15 and 16 so that the magazine 20 is held against the rear wall 17 as it is inserted into the well.

An elongated drive shaft 56 is positioned within the well 50 by means to be described in more detail hereinafter and is provided with a rounded upper end portion 57 which facilitates insertion of the drive shaft 56 into the central apertures of the reel 31 as the magazine 20 is moved downwardly into the well 50.

Figure 8:
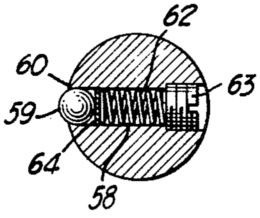
FIG. 8 is a sectional view taken along the line 8—8 of FIG 7.

The elongated drive shaft 56 is provided with a plurality of drive means spaced along the length thereof which are adapted to be positioned in alignment with the reels 31 of the respective cartridges 28 which are positioned within the magazine 20. More particularly, the drive shaft 56 is provided with a series of transversely extending bores 58 (FIG. 8) therethrough within each of which is positioned a steel ball 59. One end of each of the bores 58 is provided with an inturned lip portion 60 which functions to retain the ball 59 while permitting a portion thereof to extend beyond the periphery of the drive shaft 56. Each of the balls 59 is biased to a position beyond the periphery of the drive shaft 56 by means of a coil spring 62 which is located in the bore 58 between a set screw 63 and a flat washer 64 which engages the rear side of the ball 59.

The diameter of the central apertures in the reels 31 is just slightly greater than the diameter of the drive shaft 56 and as the magazine 30 is inserted into the well 50 the balls 59 spaced along the length thereof are depressed to a point within the periphery of the drive shaft 56 by engagement of the ball with the edge of the central aperture in the reel. The magazine 20 is moved downwardly within the well 50 to a point at which the bottom edge thereof rests on a pair of shoulders 66, 67 at which point the magazine 20 is so positioned that each of the balls 59 is positioned in horizontal alignment with a particular one of the reels 31 in the cartridges 28. Each of the reels 31 is provided with a series of vertically extending grooves 33 in the central aperture 32 thereof, and as the shaft 56 rotates the balls 59 enter one of the grooves 33 and remain engaged therewith so as to drive the corresponding reel 31 of each cartridge in unison at the rotational speed of the drive shaft 56.

In order to provide a spindle or guide member for the other reels 30 of the magnetic tape cartridges 28, there is provided in accordance with a further feature of the invention a spindle member 70 which is arranged to be inserted downwardly through an opening 71 formed in the top wall 72 of the magazine 20, the spindle 70 being formed with an enlarged shoulder 73 which is arranged to fit snugly within the opening 71. The lower end of the spindle 70 is provided with a rounded end portion 74 which is inserted through the central apertures in the reels 30 of the cartridges 28 as the spindle 70 is moved downwardly into the magazine 20. The end portion 74 of the spindle 70 is inserted into a brone bushing 76 positioned in the bottom wall 77 of the magazine 20 when the spindle 70 is inserted to a point at which an upper flange 78 thereon rests on the upper wall 72 of the magazine 20. In order to permit ready insertion and removal of the spindle 70, a bulb-like portion 80 is provided whereby the spindle 70 may be readily grasped and inserted or removed from the magazine 20.

Preferably, the cartridges 28 are loaded into the magazine 20, are snapped into place adjacent the rear wall 38 thereof by engagement of the lugs 34 with the groove 35, and the spindle 70 is inserted through the central apertures of the reels 30 before the magazine 20 is positioned within the well 50. With such an arrangement, the magazine 20 may be loaded by a person other than the operator of the recording mechanism. Furthermore, by providing only the drive shaft 56 over which the cartridges have to be fitted as the magazine 20 is moved into the well 50, the insertion operation is considerably shorter than with an arrangement in which a fixed guide sleeve, comparable to the spindle 70, were provided at the appropriate position within the well 50. However, it will be understood that a suitable fixed guide sleeve or post may be provided within the well 50 and supported from the base member 12 over which the reels 30 may be inserted at the same time the reels 31 are inserted over the drive shaft 56 if desired.

In order to permit insertion of the magazine 20 over the drive shaft 56, the bottom wall 77 of the magazine 20 is provided with an opening 82 therein which is of the same diameter as the opening 71 in the top wall 72 and is of substantially larger diameter than the drive shaft 56. Also, the top wall 72 of the magazine 20 is provided with a bushing 84 which is adapted to receive the upper end of the drive shaft 56 when the magazine 20 is fully inserted into the well 50. The bushing 84 thus acts as a bearing for the upper end of the drive shaft 56 so as to prevent the upper end thereof from wobbling when the shaft 56 is rotated. It will also be noted that when magazine 20 is fully inserted into the well 50, the lower end 74 of the spindle 70 is free since the shoulders 66 function to hold the magazine 20 somewhat above the base member 12.

Considering now the arrangement provided to rotate the drive shaft 56 at a substantially constant velocity, a synchronous motor 86 is suspended from the bottom of the base plate 11 by means of the posts 87. A drive shaft supporting plate 90 is mounted beneath the base plate 11 by means of the posts 91 and a vertically positioned fly wheel shaft 92 rides on a single ball bearing 93 which is positioned between the supporting plate 90 and the bottom end of the fly wheel shaft 92. A fly wheel 94 is mounted on the shaft 92 and is connected with the shaft 96 of the motor 86 by means of a belt 97, which rides on the periphery of the fly wheel 94. The fly wheel shaft 92 is journaled in a main bearing 98 which is mounted on the base plate 11 and the upper end of the shaft 92 is provided with an enlarged head portion 100 which has a central bore 102 in the top surface thereof.

The bottom end of the drive shaft 56 is provided with a transversely extending flange portion 104 and terminates in a ball portion 106 which is positioned within the bore 102. The flange 104 rests on a cork washer 108 seated on the upper surface of the head portion 100. In order to maintain the drive shaft 56 connected to the head portion 100 while providing for limited tilting movement of the drive shaft 56 with respect to the fly wheel shaft 92, there is provided a pair of shouldered bolts 110 and 111 which are threaded into the head portion 100 until the shoulders thereof rest on the upper surface of the head portion 100. The bolt 111 is positioned within a clearance opening 112 in the flange 104 and the bolt 110 is positioned with the shoulder portion thereof within a U-shaped notch 114 extending inwardly from the periphery of the flange 104. A pair of cork washers 116 are positioned between the head portions of the bolts 110, 111 and the upper surface of the flange 104. The cork washers 108 and 116 are sufficiently resilient to permit a slight cocking of the drive shaft 56 with respect to the fly wheel shaft 92 as the assembly is rotated. Accordingly, if the upper end of the drive shaft 56 is slightly out of line with the head portion 100, which may be due to a number of factors such as imprecise positioning of the magazine 20 within the well 50, etc., the washers 108, 116 give sufficiently to accommodate such misalignment. Furthermore, in accordance with an important aspect of the invention, the engagement of the ball 106 within the bore 102 insures that the angular velocity of the drive shaft 56 remains constant as the drive shaft rotates and is at the same speed as the fly wheel 92. This is particularly important in the arrangement of the present invention wherein a large number of cartridge reels are being driven simultaneously along the length of the drive shaft 56. If the rotational velocity of the shaft 56 varied, as it would if a fork or yoke type of Universal joint were employed, the resultant variation in rotational velocity would produce a pronounced "wow" when any one of the tape cartridges is played back.

In order to record a given selection on the magnetic tapes within the cartridges 28 at the same time, a plurality of recording heads are pivotally mounted behind the rear wall 17 at positions corresponding to the individual cartridges within the magazine 20 when this magazine is fully inserted into the well 50. More particularly, the rear wall 17 is provided with a vertically extending slot 120 therein and a pair of vertically extending posts 121 and 122 are mounted adjacent the edges of the rear wall 17. A first group of recording head assemblies 124 (FIG. 3) are pivotally mounted on the post 121 and a second group of recording head assemblies 126 are pivotally mounted on the post 122, the collective number of recording head assemblies 124 and 126 corresponding to the number of cartridges contained within the magazine 20.

Each of the assemblies 124 is provided with a free end portion 128 of reduced width which carries a recording head 129. In a similar manner, each of the assemblies 126 is provided with a free end portion 130 which carries a similar recording head 129, the end portions 128 and 130 of the two groups of assemblies 124 and 126 being interleaved vertically so that the recording heads 129 are spaced apart vertically by an amount equal to the separation of the cartridges 28 within the magazine 20.

Each of the recording head assemblies 124, 126 is provided with individual spring bias means for biasing the free end thereof which carries the recording head toward the rear wall 17 and hence into engagement with a tape positioned within one of the cartridges 28 when a magazine of cartridges is positioned within the well 50. More particularly, the uppermost one of the recording head assemblies 124, for example, is provided with a clearance opening 125 in the pivotally mounted body member 127 of the assembly through which a threaded adjustment screw 131 extends and is secured in a threaded opening in the rear wall 17. The adjustment screw 131 is provided with a hexagonal head 132 and a coil spring 133 is positioned between the head 132 and he body member 127. With this arrangement, the spring 133 continuously biases the free end portion 128 of the assembly 124 so that the recording head 129 is held in engagement with the tape in one of the cartridges 28. Adjustment of the screw 131 by manipulation of the head 132 may be employed to provide the correct pressure with which the recording head 129 engages the magnetic tape, as will be readily understood by those skilled in the art.

Figure 2:
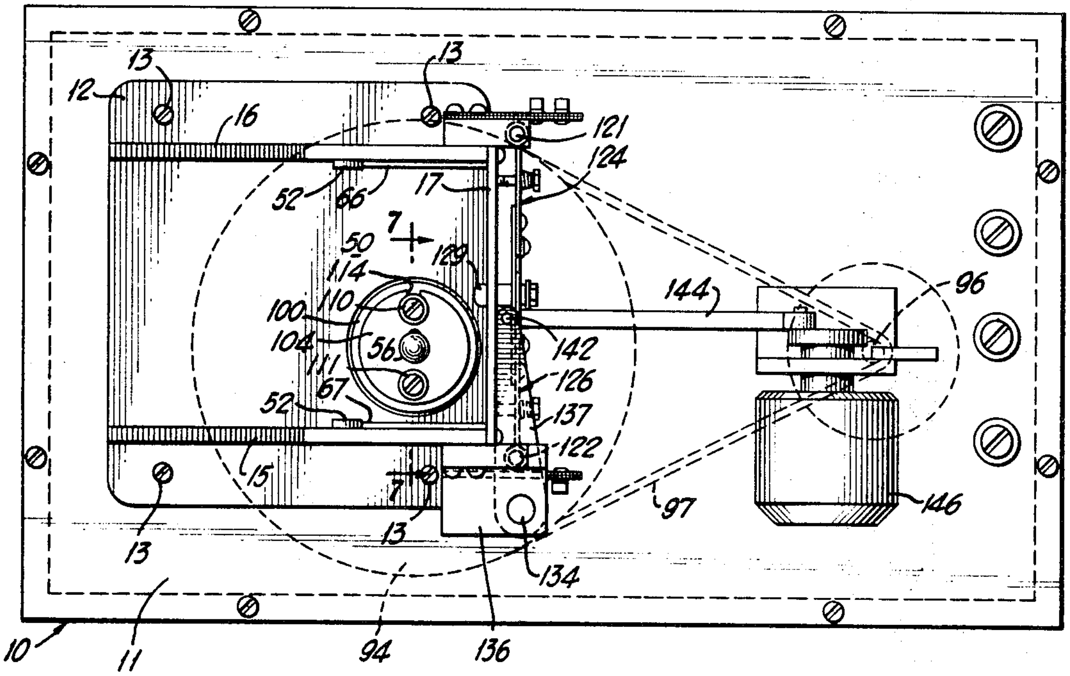
FIG. 2 is a top plan view of the apparatus of FIG. 1.
Figure 5:
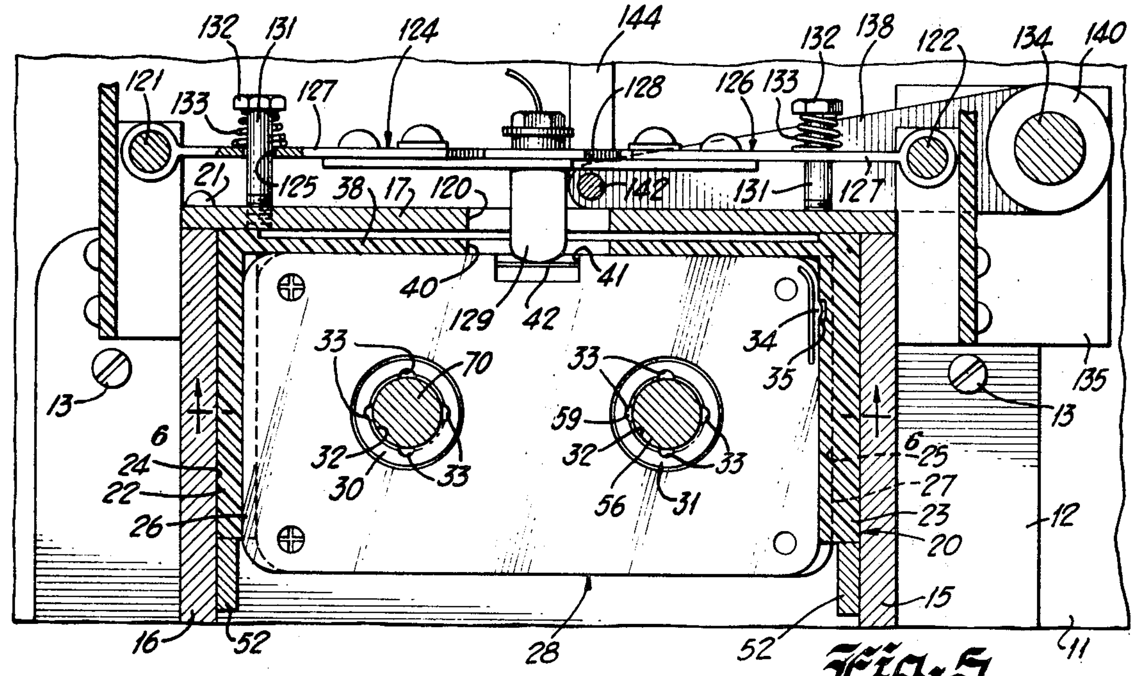
FIG. 5 is a sectional view taken along the line 5—5 of FIG. 4.

In order to control movement of all of the recording heads 129 into engagement with or out of engagement with the magnetic tapes within the cartridges 28 at the same time, a vertically extending bar 134 is supported by brackets 135 and 136 at either end thereof which are mounted on the side wall 15. A pair of horizontally extending arms 137 and 138 are connected to bushings 139 and 140 mounted on the rod 134 and the outer ends of the arms 137 and 138 are connected to a vertically extending rod 142. The rod 142 is positioned beneath the end portions 128 and 130 of the recording head assemblies 124 and 126 on one side of the recording heads 129. A control rod 144 is pivotally connected to the bottom end of the rod 142 and is arranged to be actuated by a rotary solenoid indicated generally at 146. When the solenoid 146 is deenergized, the rod 144 occupies the position shown in FIG. 2 and the recording heads 129 extend through the slot 120 in the rear wall 17 the slot 40 in the magazine 20 and the openings 41 in the individual cartridges 28 so that they engage the magnetic tape 42 in each cartridge, as shown in FIG. 5. However, when the rotary solenoid 146 is energized, the rod 144 is moved to the right, as viewed in FIG. 2, so that the rod 142 operates to pivot all of the recording head assemblies 124 and 126 outwardly so that the recording heads 129 carried thereby are moved to a point beyond the inner edge of the rear wall 17, thus permitting the magazine 20 and its cartridges to be removed from the well 50.

After a selection has been recorded simultaneously on all of the tapes in the cartridges 28 the magazine 20 is removed, the spindle 70 is removed from the magazine 20 and the magazine is inverted. In this position, the spindle 70 can then be inserted into the opening 82 and extended through the central apertures of the reels 31 and through the bushing 84. After this operation, the magazine 20 while still inverted, may again be inserted into the well 50 during which operation the drive shaft 56 is slid into the central apertures of the reels 30 and the upper end of the drive shaft 56 is inserted into the bushing 84 which acts as a bearing for the upper end of the drive shaft 56 when the magazine 20 is in the inverted position.

Considering briefly the operation of the invention described thus far, it is first pointed out that any signals on the magnetic tape in each of the cartridges 28 are preferably first erased by positioning the cartridge with the tape therein in an alternating current magnetic field which saturates the tape oxide coating. If the cartridge is now removed slowly from this alternating current field, no residual magnetism remains and a low noise level will be provided for the recorded selection, as will be readily understood by those skilled in the art. After erasure, a series of cartridges 28, corresponding to the number of notches provided in the magazine 20 are loaded into this magazine and the spindle 70 is inserted therein into the left-hand reels 30. The magazine 20 is then inserted into the well 50, it being noted that since the balls 59 are spring biased, they do not impede the insertion of the drive shaft 56 into the central openings of the reels 31 and hence facilitate the rapid insertion of the magazine 20 into the well 50 even though a large number of cartridges is to be recorded. The solenoid 156 has been energized during the insertion of the magazine 20 and is thereafter deenergized so that the recording heads 129 are moved through the slots 120, 40 and 41 into engagement with the tapes in the respective cartridges within the magazine 20, due to the force of the springs 133 in the respective recording head assemblies 124 and 126.

When the magazine 20 is inserted in the well 50 the balls 59 spaced along the drive shaft 56 may not immediately engage one of the grooves 33 in the reels 31 of the respective cartridges. However, if this occurs, the ball is depressed against the force of the spring 62 so that the magazine may be rapidly moved to the recording position within the well 50. As soon as the magazine 20 is positioned in the well 50, the motor 86 is energized so that the drive shaft starts to rotate and almost immediately thereafter the balls 59 will find the grooves 33 in each of the reels 31 and commence rotation of all of the reels in the cartridges 28 substantially simultaneously and at the same rotational rate. An electrical signal is then applied to all of the recording heads 129, preferably in accordance with the arrangement shown in FIGS. 9 and 10 to be described in detail hereinafter, wherein compensation is provided for the change in tape speed as the tapes build up on the reels 31 during rotation of the drive shaft 56. However, if no compensation for tape speed is to be provided, any suitable arrangement may be employed to supply an electrical signal to the recording heads 129. Such an arrangement may supply an identical electrical signal to each of the heads 129 in the event that all of the cartridges within the magazine 20 are to be recorded with the same selection, or in the alternative, different selections may be simultaneously supplied to different groups of the recording heads 129 so that several different selections may be recorded on the different tapes in the respective cartridges 28 at the same time. In this connection, it will be understood that a suitable terminal board arrangement is provided to establish connection to each of the recording heads 129 while minimizing electrical pickup, as will be readily understood by those skilled in the art.

Preferably, the electrical signal, or signals, is applied to each of the recording heads 129 as soon as rotation of the reels 31 is commenced by rotation of the drive shaft 56 so as to conserve tape and to provide an arrangement wherein the selection begins substantially immediately upon rotation of the reel within any given cartridge. Also, the length of tape in each of the cartridges 28 is preferably substantially the same, and the length of the recorded selection is preferably chosen so that the selection ends near the end of the tape in each cartridge. This is desirable for the reason that when the cartridges 28 are played on an automatic tape changing mechanism such as described in the above-identified copending Weigel application, the tape is wound onto the driving reel until the end of the tape is reached, and the increase in tension when the secured end of the tape is reached is employed to initiate a tape changing cycle. When the cartridge is replayed in the inverted position, the tape is wound back on the original reel while another selection, recorded in the opposite direction on the tape, is played back. In this connection, it will be understood that the recorded selection may be somewhat shorter than the length of tape provided in the cartridge 28 but with such an arrangement the tape will continue to be wound on the driven reel until the end of the tape is reached, and this period of silence may, in some instances, be undesirable. Even if such a period of silence exists, when the cartridge is inverted and played back, the second recorded selection will begin immediately since it is recorded in the same manner as described above in connection with the original recording. Therefore, the only objection in having the recorded selection somewhat shorter than the length of tape is the silent period after the end of the tape and before the cartridge is changed. Such an arrangement may not be objectionable in the event that different selections are to be recorded on the cartridges in the magazine 20 which are of slightly different lengths but which nevertheless must be recorded simultaneously.

The tapes in the respective cartridges 28 cannot be made of exactly the same length, and in fact, may vary substantially in length, as described above, while at the same time the ends of the tape are preferably secured to the reels 30, 31 in the manner described in detail in the above-identified copending Weigel application. Accordingly, if no arrangement is provided for disengaging the drive means before the end of the tape is reached, the ends of at least some of the tapes in the cartridges 28 would be pulled out of the reels to which they are attached and the cartridges would thus be rendered unsuitable for operation in the tape cartridge changing mechanism disclosed in the Weigel application.

In accordance with a further important feature of the invention, the balls 59 are biased outwardly to serve as drive means having only a relatively small driving force which can be immediately overcome as soon as the end of the tape in a particular cartridge is reached. With this arrangement the reel 31 is effectively disengaged from the drive shaft 56 as soon as the end of the tape in a particular cartridge is reached. The bias force exerted on the ball 59 is chosen by proper choice of the spring 62 and the adjustment of the adjusting screw 63 so that the force exerted by the ball 59 is not excessive and can be overcome restraining the reels 31 without breaking the tape. Such an arrangement has the additional advantage that the disengaging means is sensitive to the length of tape in each of the cartridges and when the end of the tape is reached the ball 59 moves in and out of the grooves 33 as the drive shaft 56 continues to rotate so that an audible clicking noise is produced which informs the operator that the end of the tape has been reached. While a clutch arrangement could be employed to disengage the massive fly wheel 94 from the drive shaft 56, such an arrangement would be not as sensitive as the above-described arrangement. Furthermore, the drive shaft 56 has a substantial inertia which would take an appreciable time to slow down and hence might break some of the tapes by producing too much tension thereon.

If the recorded selection is somewhat shorter than the lengths of the tapes in the cartridges 28, the motor 86 may be deenergized at the end of the recorded selection, so that rotation of the drive shaft 56 is terminated. In the alternative, the motor 86 may be continuously energized until the above-described clicking noise informs the operator that the end of the tape has been reached in the cartridge 28 whereupon the motor 86 may be deenergized by actuating a simple on-off switch (not shown).

The magazine with the desired selection recorded in each of the cartridges 28 is then removed from the well 50, the spindle 70 is removed from the central apertures of the left-hand reels 30, the magazine 20 is inverted, and the spindle is inserted into the magazine while in the inverted position and through the central apertures of the reels 31. The magazine 20 is then reinserted into the well 50 and the same recording procedure is performed while the tape is being wound back on the original reel 30 so that a different selection is recorded on the tape when it is being wound in the opposite direction. At the end of the recording operation, the motor 86 is deenergized and solenoid 146 is energized to remove the heads 129 whereupon the magazine 50 is removed.

Figure 9:
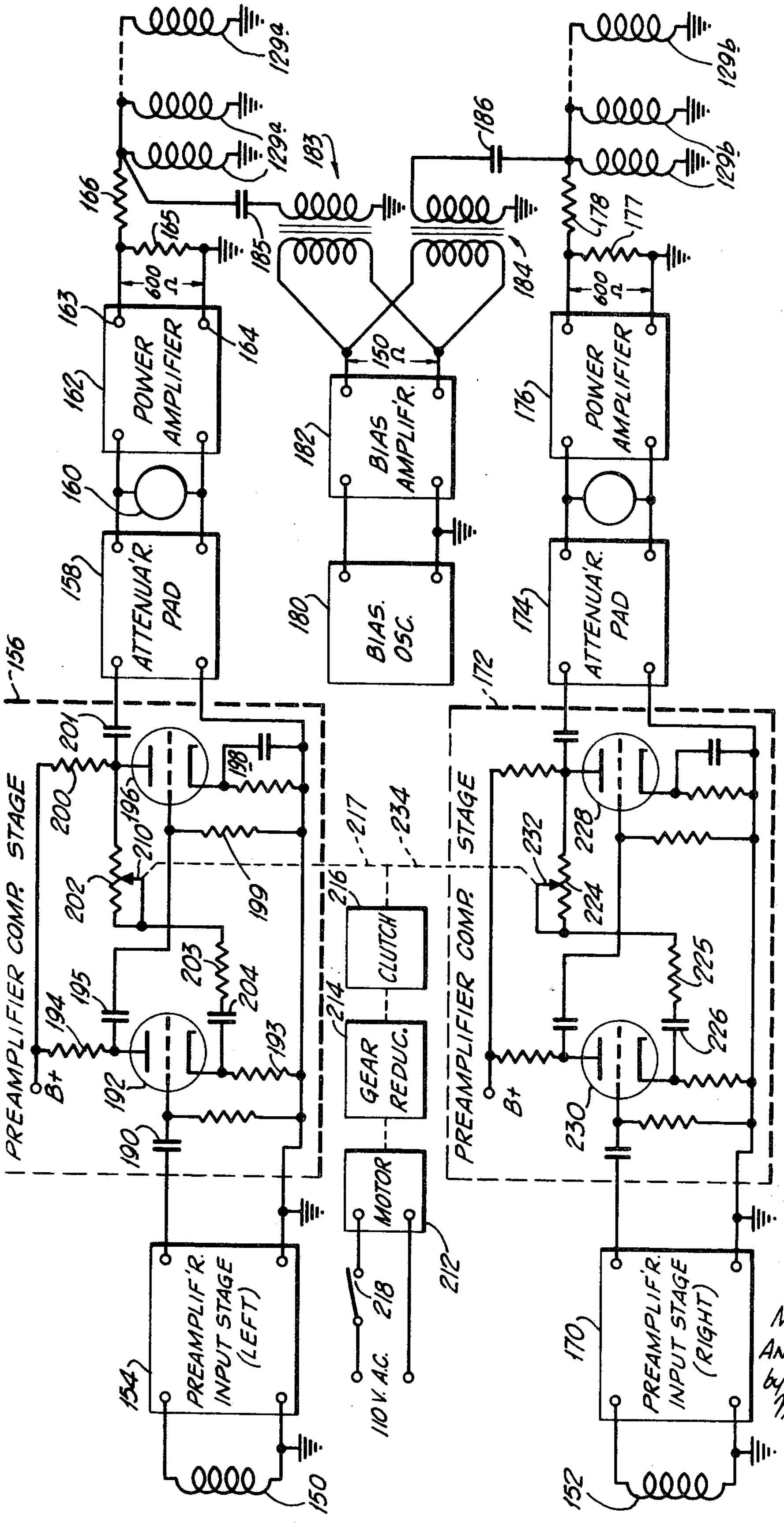
FIG. 9 is a schematic diagram of the electrical arrangement employed in the apparatus of FIG. 1 to record simultaneously in all cartridges and to effect compensation for change in tape speed during the recording operation.

Considering now the ararngement shown in FIG. 9 whereby the desired selection may be recorded on each of the tapes in cartridges 28 while providing compensation for the change in tape speed in accordance with the present invention, it is assumed that the selection to be recorded is to be recorded in stereo on each magnetic tape. Accordingly, a pair of playback heads 150 and 152 are provided in the event that the selection to be recorded in the cartridges 28 is already recorded on magnetic tape. In this connection, it will be understood that if a live program is to be recorded, the playback heads 150 and 152 would be replaced by suitable microphones. Also, it is pointed out that the selection to be recorded in the cartridges 28 may be monaural in which case only one recording channel is required, as will be readily understood by those skilled in the art.

Considering first the left channel of the stereo recording arrangement, the playback head 150 is supplied to a preamplifier input stage 154 of conventional design the output of which is supplied to a preamplifier compensation stage indicated generally at 156. The output of the preamplifier compensation stage is supplied to a suitable attenuator pad 158, the output of which may be read on a conventional db meter 160. The output of the attenuator 158 is supplied to a power amplifier 162 having a pair of output termnial 163 and 164 which are, in the illustrated embodiment, arranged to match a 600-ohm output impedance. A resistor 165 is connected across the terminals 163, 164 and a series resistor 166 is connected from terminal 163 to all of the recording head 129 connected in parallel. When these heads are to record in stereo two windings will be provided and the left windings of the recording heads 129 are indicated in FIG. 9 as the recording head windings 129*a*. In the right-hand channel a similar preamplifier 170, compensation stage 172, attenuator pad 174, and power amplifier 176 are provided, the output of the amplifier 176 being supplied to a shunt resistor 177, and a series resistor 178 is connected to the right stereo recording head windings **129*b* of all of the recording heads 129. A common bias oscillator 180 is provided, the output signal of which is amplifier in a bias amplifier 182 having a 150-ohm output impedance which is connected to a pair of coupling transformers 183 and 184. Secondary winding of the transformer 183 is coupled through a capacitor 185 to the upper end of all of the recording head windings 129*a*. In a similar manner the secondary winding of the transformer 184 is connected through a capacitor 186 to all of the recording head windings 129*b*. With this arrangement, the correct biasing level is established for all of the recording heads 129**, as will be readily understood by those skilled in the art.

Since each of the recording head windings **129*a* and 129*b* constitutes almost a pure inductance, the output thereof will vary with frequency. In order to maintain a substantially constant current at all recording frequencies, the resistor 166 is chosen with a relatively large value so that the current supplied to all of the recording head windings 129*a* is maintained substantially constant at all frequencies. Preferably, the resistor 165 has a value of 560 ohms and the resistor 166 has a value of 3,900 ohms. With this arrangement, the entire network connected to the terminals 163 and 164 has substantially a 600-ohm impedance over the range of frequencies normally recorded. The resistor 177 and 178 have similar values in the other channel of the recording system so as to maintain constant current supplied to the windings 129*b*. The secondary windings of the transformers 183 and 184 preferably have an impedance of 20,000 ohms each and the capacitor 185 and 186** have a value of 500 micromicrofarads to provide the correct biasing signal for the respective recording head windings.

Considering now in more detail the arrangement provided in the compensation stage 156 to provide at least partial compensation for the change in tape speed as the selection is recorded on the tapes contained in the cartridges 28, the output from the preamplifier 154 is coupled through a capacitor 190 to the grid of a triode amplifier tube 192 the cathode of which is connected to ground through an unbypassed feedback resistor 193. The plate of the tube 192 is connected to the B plus supply through a load resistor 194 and is also coupled through a capacitor 195 to the grid of a second amplifier tube 196. The cathode of the tube 196 is biased by means of a cathode bias network 198, and the grid of this tube is connected to ground through a grid leak resistor 199. The plate of the tube 196 is connected to the B plus supply through a resistor 200 and through a coupling capacitor 201 to the attenuator pad 158.

In order to provide a feedback path between the plate of the tube 196 and the cathode of the tube 192, one end of a potentiometer 202 is connected to the plate of the tube 196 and the other end of the potentiometer 202 is coupled through a fixed resistor 203 and a capacitor 204 to the cathode of the tube 192. The capacitor 204 is chosen to have a relatively small value so that the negative feedback between the plate of the tube 196 and the cathode of the tube 192 is greater at the higher frequencies.

The potentiometer 202, the resistor 203 and the capacitor 204 constitute a negative feedback circuit between the plate of the tube 196 and the cathode of the tube 192 which provide a variable amount of feedback at different frequencies. The capacitor 204 is of relatively small value so that a larger amount of negative feedback is provided at the higher frequencies. Preferably, the potentiometer 202 has a value of 20,000 ohms, the resistor 203 has a value of 10,000 ohms, and the capacitor 204 has a value of .01 microfarad, it being understood, of course, that these values may be changed somewhat depending upon the other circuit constants and the tube types employed, as will be readily understood by those skilled in the art. The arm 210 of the potentiometer 202 is connected to the left-hand end of this potentiometer (FIG. 9) and when the arm 210 is moved fully to the left, so that the full resistance value of the potentiometer 202 is included in the feedback path, the overall compensation characteristic of the elements 154, 158 and 162 is designed so that the standard equalization characteristic will be provided at the tape speed at which the reels 31 are driven at the start of the recording operation, i.e., the lowest speed at which the tapes are driven in the cartridges 28.

Figure 10:
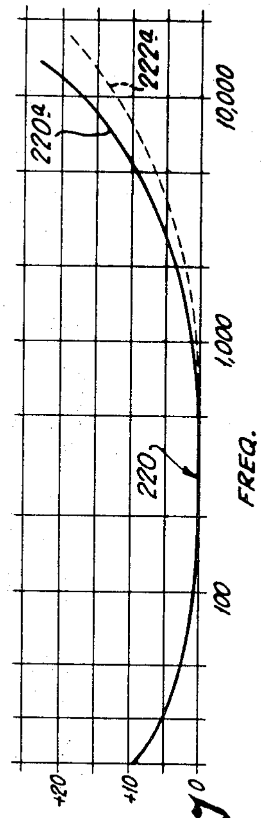
FIG. 10 is a graph illustrating the change in the recording characteristic which is made during the recording operation.

In order to move the arm 210 of the potentiometer 202 in correlation with the recording operation so that compensation is provided for the change in tape speed as the tape builds up on the driven reel within the cartridges 28, there is provided a synchronous motor 212 the output shaft of which is connected through a gear reduction mechanism 214 and a clutch 216 to the arm of the potentiometer 210, this mechanical coupling being indicated by the dotted line 217 in FIG. 9. The motor 212 is arranged to be energized from a conventional power source through the switch 218 and this motor is preferably energized by closure of the switch 218 at the same time as the motor 86 is energized to initiate rotation of the drive shaft 56. Accordingly, as the motor 212 rotates, the arm of the potentiometer 210 is rotated at a relatively slow speed through the gear reduction 214 and the clutch 216 in such direction that the resistance of the potentiometer 202 decreases as the recording operation proceeds. The gear reduction 214 is so chosen that the potentiometer 202 will be moved somewhat less than one full revolution over the length of the recorded selection. Accordingly, as the recording operation proceeds, the amount of negative feedback developed by the above-described feedback circuit will increase and hence reduce the level at which the high frequency components of the selection are being recorded on the taps within the cartridges 28. In FIG. 10 there is shown in a solid line a typical frequency response characteristic 220 for a magnetic tape recording amplifier and it will be noted that the high frequency portion **220*a* of the curve 220 has an upward slope to take care of recording losses due to the erasing effect of bias current and the demagnetization effect which is most severe at higher frequencies. The curve 220** is chosen so that with a standard playback equalization curve the overall response curve of the record-playback operation is substantially linear, as will be readily understood by those skilled in the art.

As the tape speed increases during the recording operation, the movement of the potentiometer arm 210 causes the frequency response characteristic of FIG. 10 to vary so that the high frequency portion of this characteristic changes to the shape indicated in dotted lines in FIG. 10 at **222*a* at substantially the end of the recorded selection. In this connection it will be understood that the amount of compensation provided by adjustment of potentiometer on the arm 210 must be correlated with the length of magnetic tape included within the cartridge 28. Furthermore, the tape buildup on the driven reel, and hence the tape speed, is not linear but instead will increase more rapidly near the end of the recorded selection. Accordingly, the potentiometer 202 is preferably provided with a properly shaped curve of resistance versus rotation so that the proper compensation is provided over substantially the entire length of the recorded selection. It will be understood that the shape of the recording frequency characteristic shown in FIG. 10 may vary somewhat depending upon the shape of the equalization curve which is used on playback. However, with any particular recording equalization curve, the high frequency portion thereof should be decreased by an appropriate amount as the tape speed increases over the length of the recorded selection by proper choice of the rate at which the arm 210 is driven and the resistance-rotation characteristic of the potentiometer 202**.

When the recording operation is completed, the motor 86 is deenergized and the motor 212 may also be deenergized at the same time. The clutch 216 is then used to disengage the mechanical connection to the arm 210 so that the potentiometer arm 210 may be reset to its initial position, i.e., adjacent the end of the potentiometer to which the arm 210 is connected. In the alternative, the motor 212 may remain continuously energized and the clutch 216 may be employed to engage the gear reduction mechanism 214 with the arm 210 at the start of the recording operation and to disengage the same at the end of the recording operation.

In the other stereo amplifier channel, an arrangement similar to that described above is provided for the compensation stage 172. In this stage the potentiometer 224 is connected in series with a resistor 225 and a capacitor 226 between the plate circuit of the second amplifier tube 228 and the cathode of the first amplifier tube 230. The arm 232 of the potentiometer 224 is also mechanically connected to the gear reduction mechanism 214 through the clutch 216, as indicated by the dotted line 234 in the drawing. The potentiometers 224 and 202 may, of course, be on the same shaft if desired. It will also be understood that in the event monaural recording is desired, one of the above-described stereo channels may be eliminated, as will be obvious to those skilled in the art.

While there have been illustrated and described various embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. In an apparatus for simultaneously recording on the magnetic tapes within a plurality of magnetic tape cartridges, the combination of, a vertically extending driveshaft, drive means spaced along the length of said driveshaft, means for rotating said driveshaft, a plurality of magnetic tape cartridges each including a pair of reels having central apertures therein and a length of magnetic tape connected to said reels at opposite ends thereof, means for positioning said cartridges so that said driveshaft is positioned within the central apertures of one of the reels of each of said cartridges and said drive means are in alignment with said reels thereof, means on said cartridges and cooperating with said drive means for rotating said reel in each of said cartridges simultaneously, and means including a plurality of recording heads in engagement with the tapes in said cartridges for simultaneously recording information on all of said tapes as said cartridge reels are rotated, said drive means being individually arranged automatically to disconnect the corresponding reel from said driveshaft when the end of the tape in the same cartridge is reached.

2. An apparatus as set forth in claim 1, including a plurality of transversely extending apertures spaced along the length of said driveshaft, and a plurality of spring biased drive members positioned in said transverse apertures and individually biased to project beyond the periphery of said driveshaft, said cartridges being positioned so that one of said drive members is in alignment with the reel in each of said cartridges and is arranged to be retracted within the aperature when the end of the tape is reached.

3. In an apparatus for simultaneously recording on the magnetic tapes within a plurality of magnetic tape cartridges, the combination of, a vertically extending driveshaft, drive means spaced along the length of said driveshaft, means for rotating said driveshaft, a plurality of magnetic tape cartridges each including a reel having a central aperture therein, means for positioning said cartridges so that said driveshaft is positioned within the central apertures of each of said cartridges and said drive means are in alignment with said reels thereof, means on said cartridges and cooperating with said drive means for rotating said reel in each of said cartridges simultaneously, means including a plurality of recording heads in engagement with the tapes in said cartridges for simultaneously recording information on all of said tapes as said cartridge reels are rotated, a second driveshaft positioned below said first driveshaft and coaxial therewith, means for rotating said second driveshaft, and means for coupling said second driveshaft to said first driveshaft in such manner that said first driveshaft is rotated at substantially constant velocity.

4. In an apparatus for simultaneously recording on the magnetic tapes within a plurality of magnetic tape cartridges, the combination of, a vertically extending driveshaft, drive means spaced along the length of said driveshaft, means for rotating said driveshaft, a plurality of magnetic tape cartridges each including a reel having a central aperture therein, means for positioning said cartridges so that said driveshaft is positioned within the central apertures of each of said cartridges and said drive means are in alignment with said reels thereof, means on said cartridges and coperating with said drive means for rotating said reel in each of said cartridges simultaneously, means including a plurality of recording heads in engagement with the tapes in said cartridges for simultaneously recording information on all of said tapes as said cartridge reels are rotated, a second driveshaft positioned below said first driveshaft and coaxial therewith, means including a constant velocity universal joint for coupling said second driveshaft to said first driveshaft, a filywheel positioned on said second driveshaft, drive means in engagement with said flywheel for rotating the same at substantially constant speed, a base member, and means including a single ball bearing positioned between said base member and the bottom end of said second driveshaft for supporting said first and second driveshafts and said flywheel.

5. In an apparatus for simultaneously recording a selection on the magnetic tapes within a plurality of magnetic tape cartridges, the combination of, means defining a vertically extendnig well, a vertically extending driveshaft positioned within said well, drive means spaced along the length of said driveshaft, means for rotating said driveshaft, a magazine having a plurality of magnetic tape cartridges positioned therein and arranged to be positioned in said well, said plurality of magnetic tape cartridges each including a reel having a central aperture therein, said magazine supporting said cartridges so that said driveshaft is positioned within the central apertures of each of said cartridges and said drive means are in alignment with said reels when said magazine is positioned in said well, and bearing means for the upper end of said driveshaft positioned in the top wall of said magazine in alignment with the central apertures in said reels.

6. In an apparatus for simultaneously recording on the magnetic tapes within a plurality of magnetic tape cartridges, the combination of, means defining a vertically extending well, a vertically extending driveshaft positioned within said well, drive means spaced along the length of said driveshaft, means for rotating said driveshaft, a magazine having a plurality of magnetic tape cartridges positioned therein and arranged to be positioned in said well, said plurality of magnetic tape cartridges each including a pair of reels having central apertures therein, said magazine supporting said cartridges so that said driveshaft is positioned within one of the central apertures of each of said cartridges and said drive means are in alignment with said reels when said magazine is positioned in said well, said magazine having top and bottom walls having aligned first and second apertures therein, said cartridges being positioned within said magazine so that said central reel apertures are in line with said first aligned apertures in said top and bottom walls, and a spindle positioned in the other aligned apertures in said cartridges and in said second aligned apertures in said top and bottom walls.

References Cited

UNITED STATES PATENTS

| | | | |
|---|---|---|---|
| 2,239,042 | 4/1941 | Kleber et al. | 179—100.2 |
| 2,560,234 | 7/1951 | Masterson | 179—100.2 |
| 2,933,319 | 4/1960 | Proctor | 179—100.2 |

JAMES W. MOFFITT, Primary Examiner
ROBERT S. TUPPER, Assistant Examiner

U.S. Cl. X.R.

242—186